US 7,020,566 B2
Mar. 28, 2006

(12) United States Patent
Villicana et al.

(54) UTILITY POWER METER

(75) Inventors: Ernest Villicana, Tempe, AZ (US); Stephen Worth, Phoenix, AZ (US); Satish C. Kholay, Phoenix, AZ (US)

(73) Assignee: Poweronedata Corporation, Tempe, AZ (US)

( * ) Notice: Subject to any disclaimer, the term of this patent is extended or adjusted under 35 U.S.C. 154(b) by 209 days.

(21) Appl. No.: 10/262,426

(22) Filed: Oct. 1, 2002

(65) Prior Publication Data
US 2004/0061624 A1   Apr. 1, 2004

(51) Int. Cl.
G01R 21/00   (2006.01)

(52) U.S. Cl. ........................................ 702/62

(58) Field of Classification Search ........... 340/870.02; 324/158.1; 702/188, 62
See application file for complete search history.

(56) References Cited

U.S. PATENT DOCUMENTS 4,697,180 A * 9/1987 Swanson ............... 340/870.02
6,363,057 B1 * 3/2002 Ardalan et al. ............. 370/252
2002/0109608 A1 * 8/2002 Petite et al. ........... 340/870.02

OTHER PUBLICATIONS

T.D. Tamarkin, "Automatic Meter Reading," Public Power Magazine, Oct. 1992, vol. 50, No. 5., 6 pages.*

* cited by examiner

*Primary Examiner*—Evan Pert
(74) *Attorney, Agent, or Firm*—Donald J. Lenkszus

(57) ABSTRACT

A utility meter comprises an electromechanical metering portion connectable to a power drop to a premises and an electronic portion coupled to the electromechanical portion. The electromechanical portion comprises a rotating disk portion rotating at speeds proportional to power flow through said meter. The electronic portion comprises an interface coupled to the rotating disk, a controller coupled to the interface for accumulating power usage data over predetermined intervals, a memory coupled to the controller for storing power usage data, and a modem interface for coupling the controller to a public network. The controller is programmably operative to automatically establish a connection via the modem interface for uploading power usage data stored in the memory.

30 Claims, 7 Drawing Sheets

TABLE 1

USEFUL END USER FIELD FUNCTIONS
- A.    SET DATE/TIME
- B.    FORCE UPLOAD- SEND ALL AVAILABLE DATA
- C.    FORCE UPLOAD- SEND UNSENT PACKETS
- D.    FORCE POWER UP MESSAGE CONNECT
- E.    INDIVIDUAL CONFIGURATION MESSAGES
  1. SET PREMISE ID
  2. SET HOST IP ADDRESS
  3. SET HOST PORT NUMBER
  4. SET ISP 1 INFORMATION
     - a. USERNAME
     - b. PASSWORD
     - c. PHONE NUMBER
  5. SET ISP 2 INFORMATION
     - a. USERNAME
     - b. PASSWORD
     - c. PHONE NUMBER

FIG. 5

TABLE 2

FIELD PROGRAMMING- SINGLE MESSAGE SETUP
- A.    SET PREMISE ID
- B.    SET TIME (COPY OF PDA TIME)
- C.    SET HOST IP ADDRESS
- D.    SET HOST PORT NUMBER
- E.    SET ISP 1 INFORMATION
  - a. USERNAME
  - b. PASSWORD
  - c. PHONE NUMBER
- A.    SET ISP 2 INFORMATION
  - a. USERNAME
  - b. PASSWORD
  - c. PHONE NUMBER

FIG. 6

TABLE 3

A. DISPLAY CONNECT LOG
B. DISPLAYDIAGNOSTICS- SINGLE MESSAGE PLUS INDIVIDUAL MESSAGES OR READ IN BULK AND DISPLAY
   1. ID
   2. PREMISE ID
   3. METER STATUS
   4. PASSWORD
   5. PASSWORD EXPIRE DATE
   6. MASTER PASSWORD
   7. TIME TO DIAL IN
   8. ACTIVE ISP
   9. INTERVAL VALUE
   10. CURRENT TIME STAMP
   11. FIRMWARE REVISION
   12. CURRENT TEMPERATURE
   13. INTERVAL READ_PKT_PTR
   14. INTERVAL WRITE_PKT_PTR
   15. INTERVAL OLDESZT_AVAILABLE_PTR
   16. NUM_READS_COUNTER
   17. NUM_PKTS
   18. INTERVAL TIMER
   19. TOU_EVENT_CONFIG FLAG
   20. DEMAND DURATION
   21. TOU READ_PKT_PTR
   22. TOU RITE_PKT_PTR
   23. TOU_OLDEST_AVAILABLE_PTR
   24. EVENT LOG READ_PKT_PTR
   25. EVENT LOG WRITE_PKT_PTR
   26. PROGRAM DATE
   27. LAST ACCESS DATE

FIG. 7

UTILITY POWER METER

FIELD OF THE INVENTION

This invention pertains to utility company meters and systems for metering electrical energy, in general, and to single phase residential type watt-hour meters and systems and methods for the measurement of electrical energy consumption for revenue metering and for other energy consumption applications, in particular.

BACKGROUND OF THE INVENTION

Typically, electrical power supplied for residential applications is single phase alternating current power. To measure the consumption of electricity in residential applications, a utility company meter is provided at the electrical service entrance to the residence. Utility company meters are of three general types, namely, electromechanical based meters, purely electronic component based meters, and hybrid electromechanical/electronic meters. The electromechanical and hybrid type meters are essentially an induction motor in which the moving element is a rotating disk. The speed of rotation of the disk is directly proportional to the voltage applied and the amount of current flowing through the motor. The phase displacement of the current, as well as the magnitude of the current, is automatically taken into account by the meter, i.e., the power factor influences the speed of rotation of the disk. The result is that the disk rotates with a speed proportional to true power. In the electromechanical type of meters, a register is used to register the number of revolutions, and the gearing is arranged to be read directly in kilowatt-hours.

The electric utility meters most commonly in use are of the electromechanical type. The meters are generally highly reliable, but do not lend themselves to remote or automated reading.

Hybrid meters typically utilize electronic circuitry in combination with the rotating disk to permit at least limited two-way communication to/from the meter. Typically, the two-way communication is limited to reading the meter via a proprietary communications link that frequently is a limited range radio frequency link.

It is not uncommon for electric utilities to utilize both simple and complex tariffs. The tariffs may be time of use type tariffs, or may be changed from time to time or on predetermined dates to provide for various time of use type of rates.

It is common practice for utility companies to access meter information on only a monthly or 30 day period.

In addition, present metering technology makes it inconvenient for a consumer to determine in a timely fashion the amount of energy being consumed.

SUMMARY OF THE INVENTION

The present invention provides the next generation of time-sensitive advanced metering data collection and management solutions for utilities and energy service providers. The meter and system of the invention provide unmatched two-way, secure internet-based access to real-time usage information between data networks and control systems.

The system measures residential energy consumption and automatically communicates this information to a host computer. The host computer can then be accessed by the end utility customer or other authorized entities. This Internet or web based system offers two-way communication capability to support meter reconfiguration. The system is comprised of two major elements, a hardware unit and database software.

In accordance with one aspect of the invention, the hardware unit is a printed circuit type card that retrofits into form 2S single-phase residential-type meters. The unit measures residential energy consumption in predefined intervals, stores the measurements, and communicates at predefined times to a host database server. The unit can accommodate various wired or wireless communication technologies through a simple communications port.

In accordance with another aspect of the invention, the database software resides at a server and provides for storage, configuration and analysis of energy usage data that is transmitted from the hardware unit. The database maintains the usage information in a summarized form and provides real time analysis of the data via open and secure API's (application protocol interfaces). The database can be accessed over the Internet to access and extract data files. The output format of the database can readily be configured to integrate to a utility company's computer system and database.

Electric usage meters in accordance with the invention, capture and transmit energy-use information in configurable time intervals directly to a data center via public networks. Each meter in accordance with the principles of the invention includes built-in measurement and state-of-the-art data communications systems that provide high-volume, real-time energy-use monitoring over the Internet to a server and database. By utilizing the Internet, cost-effective reliable intelligent meter modules, existing public network infrastructure, and sophisticated head-end database management systems, a system in accordance with the principles of the invention offers unparalleled practical, flexible, metering modernization solutions to electric utilities customers. The system of the present invention eliminates the need to deploy costly, complex, and often high-maintenance private communications networks to capture periodic utility data. Standard Internet browser technology and encrypted messaging provide secure, easy accessibility to metered data. The meters and system provide the ability to capture, analyze and consistently deliver accurate and timely electric-use consumption data is critical to the future growth of electricity providers everywhere.

A utility meter in accordance with the principles of the invention comprises an electromechanical metering portion connectable to a power drop to a premises and an electronic portion coupled to the electromechanical portion. The electromechanical portion comprises a rotating disk portion rotating at speeds proportional to power flow through said meter. The electronic portion comprises an interface coupled to the rotating disk, a controller coupled to the interface for accumulating power usage data over predetermined intervals, a memory coupled to the controller for storing power usage data, and a modem interface for coupling the controller to a public network. The controller is programmably operative to automatically establish a connection via the modem interface for uploading power usage data stored in the memory.

Power usage data is accumulated and stored incrementally for automatic transmission. In the illustrative embodiment of the invention, power usage data is acquired from meters in 15-minute increments instead of the monthly or 30-day time frame presently used. As a result, utilities can better predict and manage electricity use. The meter of the invention gives great latitude to utilities to select a deployment strategy best suited to their unique needs. There is no implicit requirement for mass installation of geographic metering territories as with some systems. Thus, utilities with strategies for "surgical" implementation of AMR are easily accommodated.

In accordance with the principles of the invention a remotely configurable meter includes a unique physical meter number and is provided with a unique electronic serial number.

The meter includes memory for storing rate schedule information and for storing consumption information based upon the rate schedule information.

In accordance with another aspect of the invention, the meter utilizes a public network for the communication link. In one embodiment of the invention, the public network comprises a worldwide network of computers. The public network in the embodiment shown comprises the Internet and the communications link includes a telephone link. The telephone link comprises one or more of a wired telephone line, a wireless telephone line, a radio frequency communications link, and an optical link.

In the illustrative embodiment of the invention the rate schedule information may be a time of use plan or a flat rate plan. Downloading of predetermined intervals from the database to the meter as part of the configuration information is used by a the meter to calculate usage.

In accordance with another aspect of the invention an optical communications link is provided at the electric utility meter. A handheld device is utilized to download configuration information to the electric utility meter via the optical link. The handheld device in the illustrative embodiment may be selected from one of a personal digital assistant or a computer.

The configuration information may include a premises identification code downloaded from the handheld device to the electric utility meter via the optical link.

The information may also include Internet service provider information including at least one telephone number to access a server via a communications link. The information may further include a username and password.

In accordance with an aspect of the invention the handheld device is used to control the meter such that the electric utility meter initiates a connection via a public network communications link to a server and to causes the meter to upload stored data to the server.

In accordance with another aspect of the invention the handheld device utilizes the optical link to perform field diagnostic functions.

Still further in accordance with the invention the meter responds to the handheld device to establish a TCP/IP connection to a server via a communications link over a public network.

BRIEF DESCRIPTION OF THE DRAWING

The invention will be better understood from a reading of the following detailed description in conjunction with the drawing figures in which like reference numerals are used to designate like elements, and in which:

FIGS. 5, 6, and 7 are tables of functions provided in accordance with the invention.

DETAILED DESCRIPTION

Each utility meter is required to record the electricity consumption at a particular premises. With the advanced metering provided by a time of use meter in accordance with the principles of the invention, it is possible to support a number of different pricing plans. These plans vary the cost of electricity of the consumer according to the time of day and/or maximum load that the consumer draws from the utility grid. The meter and system described here allows a utility company to remotely control the schedule programming of individual meters from a central computer. All information relating to calendars, daily schedules (On peak, Off peak, shoulder 1 and shoulder 2 rate time intervals) and seasonal information is downloaded annually from the database server or whenever there is a change required (such as a rate change or if a customer changes from a flat rate kWh plan to a Time of Use plan)

Figure 1:
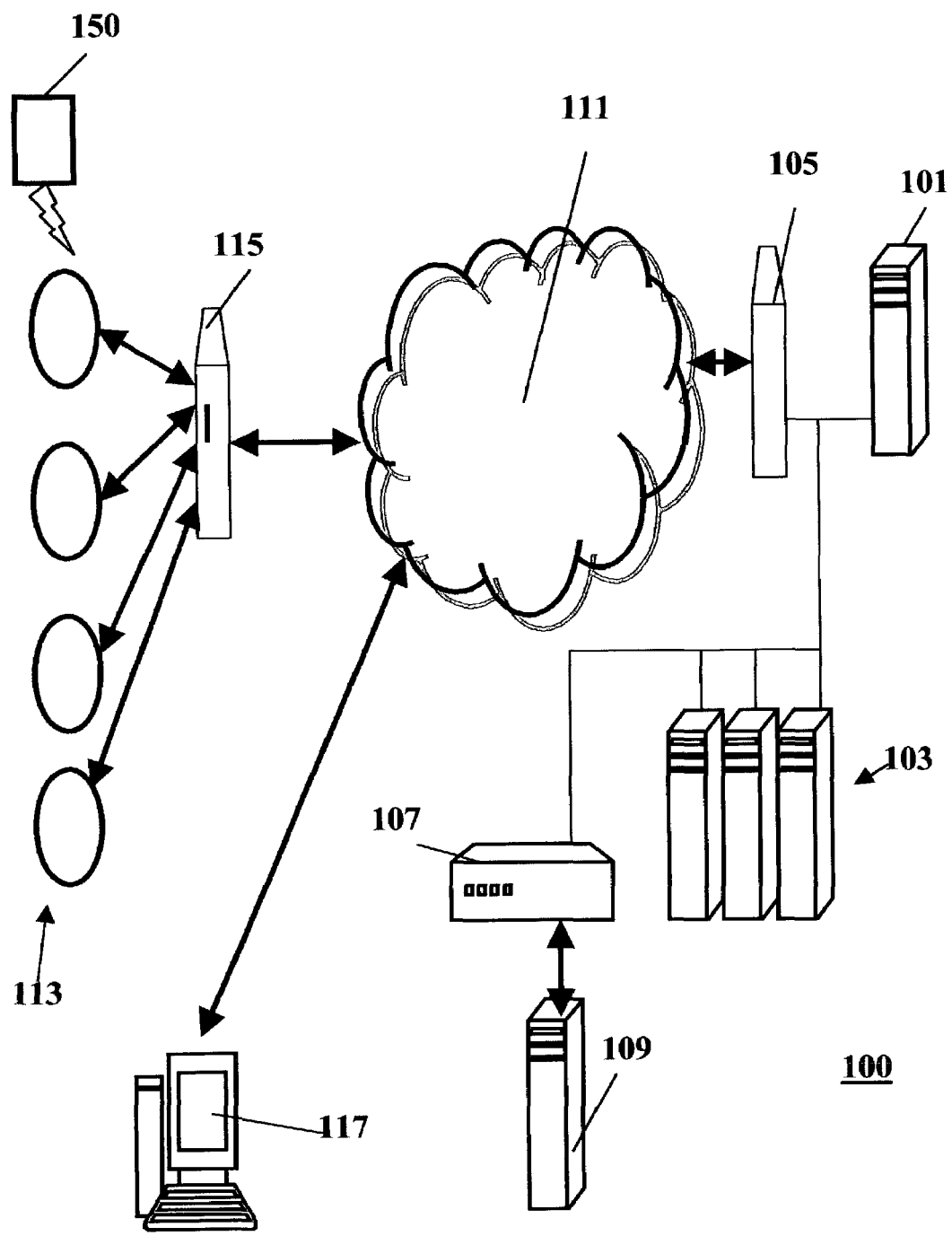
FIG. 1 is a block diagram of a meter reading and control system in accordance with the principles of the invention.

In accordance with the principles of the invention, a new and novel utility meter is provided and a new and novel system and method for acquiring metered information is provided. The system in which the meters may be utilized is shown in FIG. 1. The system is designated generally at 100. System 100 includes a server 101. Server 101 is coupled to a data center 103 that includes relational databases in which utility meter acquired data and account information is stored. System 100 is coupled via a firewall 105 to a computer network that in the embodiment shown is the Internet 111 that has access to utility meters 113. System 100 also is accessible via protective firewalls 107 by the utility company's virtual private network 109. Bi-directional communication occurs between each utility meter 113 and system 100 via point of presence (POP) 115. In addition, Internet communication devices such as personal computer 117 may access meters 113 and system 100.

The hardware design is comprised of a controller with program memory, a liquid crystal display to replace the mechanical registers of the retrofitted meter; direction sensing infra-red disk interface, IrDA communications port for diagnostics; non-volatile memory for interval reading storage; a real-time clock for time stamping of data measurements and a serial port to interface with various wired or wireless communication modules. The unit features Time of Use (TOU) demand metering as well as flat rate metering; records usage in predefined intervals, such as 15, 30, or 60 minutes, or other interval; stores up to 31 days of 15 minute interval data; is programmable to send information to host computer daily; power failure detection; backward rotation detection. The unit can access dual ISP's to enhance communication reliability through redundancy. The meter software establishes an Internet connection to the portal server that, in turn, executes a set of procedures to validate each transaction from the meter to the database server before inserting packet data into the database server. Data integrity and duplication checks are performed in the validation process. The software manages field upgrades through the Internet; offers event notification of hardware failure, power up, power outage and tamper/theft detection with notification capabilities; offers diagnostics of event, connect and diagnostics logs.

Included with this system is a basic set of energy consumption reporting software. These reports offer monthly and daily usage in the presentation format of tabular, bar or pie charts.

Each utility meter 113 is capable of measuring energy consumption in real time. Electrical usage readings are taken at programmed predetermined intervals and are stored in a non-volatile memory at the utility meter. Each meter 113 periodically establishes a link to system 100. In the illustrative embodiment of the invention, the link is via the public telecommunications network. Each meter 113 includes a modem that, in this embodiment of the invention, is controlled to establish a link via the telephone lines at the residence where the utility meter is installed. Meter 113 includes an auto dialer that is under software control at the respective meter 113 to dialup a connection via Internet 111 to system 100 to upload power usage data from meter 113 to system 100 for storage in data center 103.

As noted above, each utility meter 113 takes electricity usage data in predetermined intervals that are determined by embedded software in the meter 113. The predetermined intervals may be pre-selected at 5, 10, 15, 30, or 60 minutes. The usage is calculated in accordance with predetermined quantifications or "buckets" of total power consumed, power consumed in peak times, power consumed in off-peak times; and power consumed during peak/off-peak shoulder periods. To reduce interference with telephone usage at the residence where the meter is installed, and to take advantage of lower priced night rates, meter 113 communicates to system 100 during night hours of 12 pm to 5 am.

Figure 2:
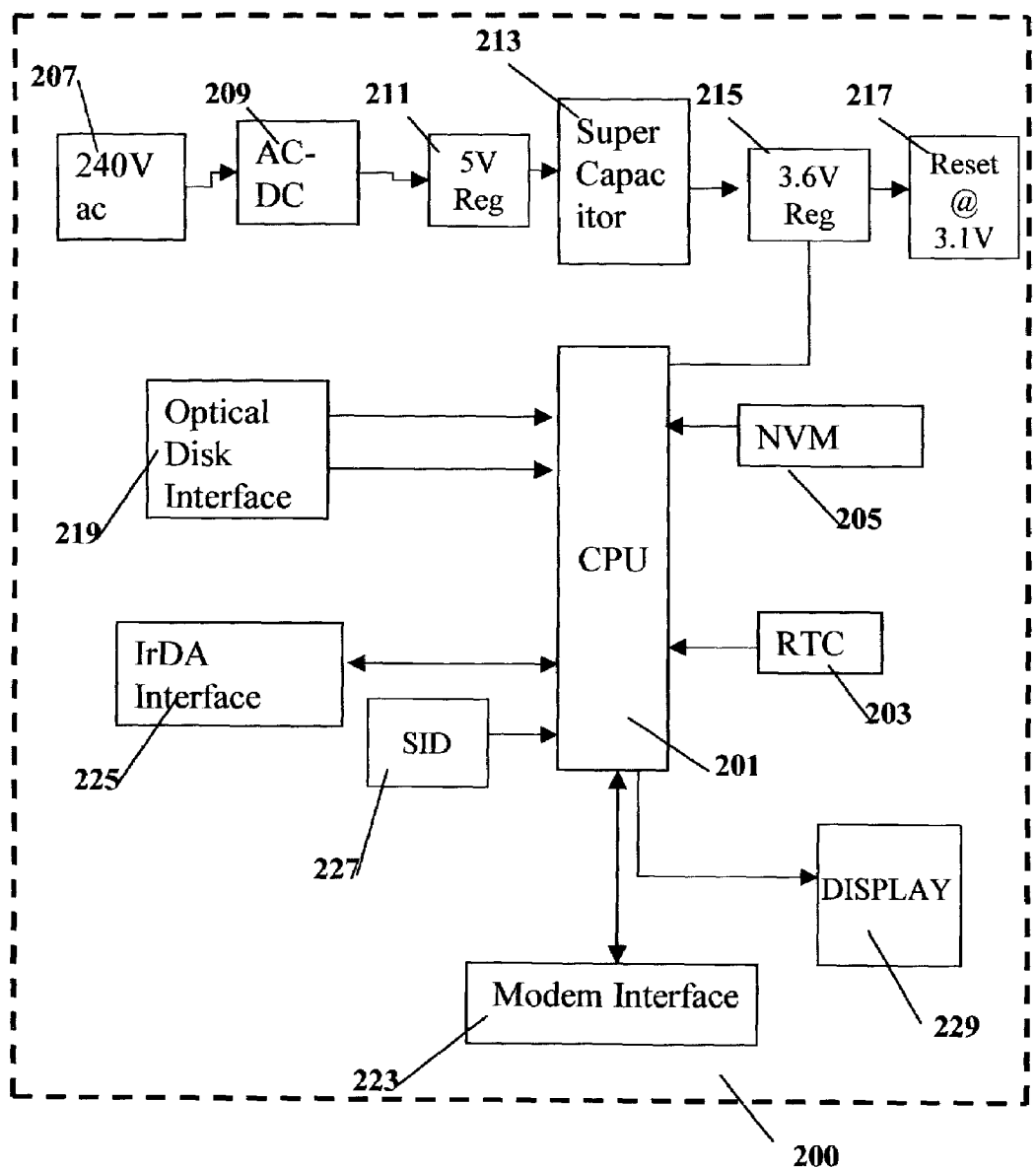
FIG. 2 is a block diagram of a power meter in accordance with the principles of the invention.

In the illustrative embodiment of the invention, each utility meter 113 is a hybrid electromechanical/electronic meter. The electromechanical portion includes the rotating disk that operates as an induction type squirrel cage motor as described above. The register portion of the meter is replaced with a programmable structure. The programmable structure 200 of a meter 113 in accordance with the principles of the invention is shown in FIG. 2.

The illustrative embodiment comprises a printed circuit board or structure 200 that is added to a conventional single-phase electromechanical meter. Printed circuit board 200 carries the components that are represented in the block diagram of FIG. 2.

Structure 200 includes a power supply 207. Power supply 207 provides direct current power to the various components of structure 200. Power supply 207 includes a rectifier 209 coupled to a first voltage regulator 211 that provides a 5 volt d.c. output. First regulator 211 is coupled to a "super" capacitor 213. Super capacitor 213 comprises two 4.7 Farad capacitors. Super capacitor 213 is provided to provide for uninterrupted power to structure 200 for a period of time should there be brief power outages. The voltage output of super capacitor 213 is coupled to a second voltage regulator 215. Second voltage regulator 215 is a 3.6 volt regulator that provides power to the remainder of the circuits of structure 200. An under voltage circuit 217 is coupled to the output of second voltage regulator 215. In the event that the voltage output of second voltage regulator 215 falls to a predetermined voltage level, a trigger signal is generated that is utilized to trigger a reset function.

Structure 200 includes a controller 201. Controller 201 is a commercially available microprocessor. A real time clock controller 203 is controlled by a crystal oscillator is coupled to controller 201 to provide clocking for operation of controller 201. A non-volatile electrically modifiable memory NVM 205 (EEPROM, FRAM or other commercially available memory) is coupled to processor 201.

An optical disk interface 219 is coupled to controller 201 and to the rotating disk of utility meter 113. Optical disk interface 219 is optically coupled to the rotating disk and generates signals to CPU 219 to indicate power consumption.

Structure 200 includes an onboard silicon serial number chip 227. Silicon serial number 227 is a commercially available product. Each chip is a unique, factory-lasered and tested 64-bit registration number that includes an 8 bit family code, plus a 48-bit serial number plus an 8-bit CRC tester. No two parts are alike. One such product is the DS2401 available from Dallas Semiconductor Structure 200 further includes an optical communication or infrared data access interface 225. IrDA interface 225 is capable of communicating with a handheld device.

Structure 200 also includes a wide area network interface 223 that provides one or more of analog modem functionality, cellular telephone modem functionality, satellite communication functionality, 2 way paging functionality, or power line carrier functionality.

In addition, structure 200 includes a display module and display driver 229 coupled to controller 201. The display module is utilized to provide an electronically generated human readable output of energy consumption. In another embodiment of the invention, display and driver 229 may be mounted separate from meter 113. For example, display and driver 229 may be mounted inside the customer's premises rather than at meter 113 to thereby permit the customer to more easily see power consumption. By providing a display that is readable within the serviced premises, the owner of the premises may be better able to manage and reduce power consumption.

In yet another embodiment of the invention, meter 113 may be coupled to display driver 229 via wireless or wired technology.

Each printed circuit board 200 and its associated utility meter 113 is uniquely identified by the silicon serial number 227. In addition, each utility meter 113 has an identification number that is assigned to it that is unique to the utility providing service. The identification number is displayed on a nameplate on meter 113 and is displayed in alphanumeric form as well as in a bar code format. During the final stage of manufacturing of utility meters 113, meter identification number and the corresponding silicon serial number are transmitted to data center 103 and stored in the database.

The bar code on the meter 113 is scanned into a handheld device and subsequently beams the identification number via IrDA interface 225 to controller 201. Controller 201 stores the identification number in memory. On a command from the operator, controller 201 utilizes modem interface 223 to contact database server 101 to transmit the identification number and silicon serial number to database 103 so that the correlation between the identification number and the silicon serial number may be recorded.

Data center 103 must store information pertaining to rate schedules for each individual service residence/account. By way of example, the rate schedules may be flat rate or time of use. If the rate schedule is time of use, then the rate schedule to be implemented is also associated with the individual service residence/account.

Figure 3:
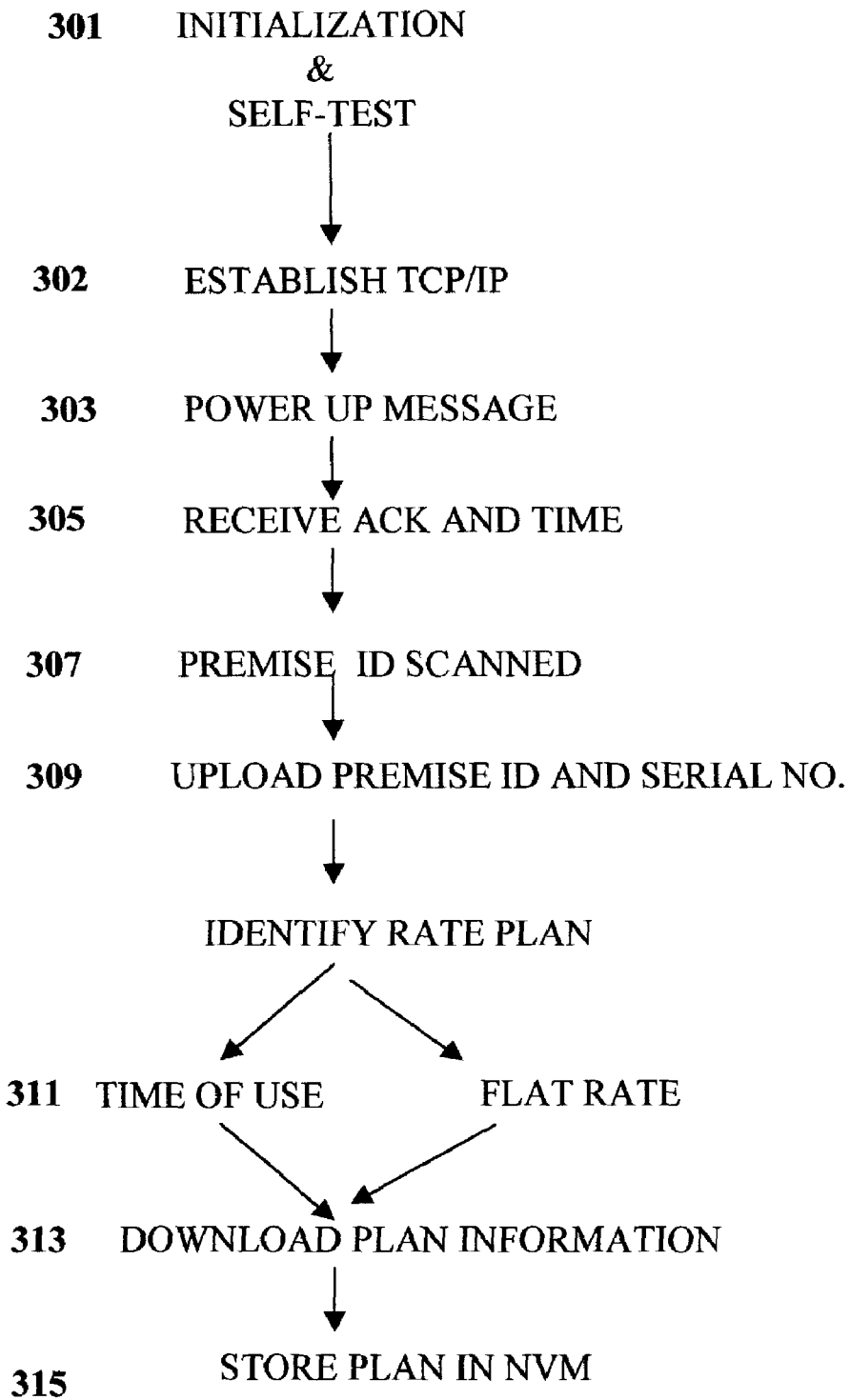
FIGS. 3 and 4 are flow charts illustrating a method of remotely configuring individual power meters in accordance with the principles of the invention.

When an installer installs a meter 113 at a customers premises the following steps as shown in FIG. 3 occur. At step 301 the meter is powered up. Upon power up, the meter goes through an initialization and self-test process. The initialization and self-test is performed in accordance with software stored in NVM 205. Upon completion of the initialization and self-test, controller 201 utilizes modem 223 to establish a TCP/IP connection with server 101 and sends a message to server 101 that it is powered up at step 303. Server 101 receives the power up indication. Server 101 sends an acknowledgement signal back to controller 201 and also transmits the current time to controller 201. At step 305, controller 201 receives the time indication from server 101 and utilizes the time indication to set its internal clock. In addition, controller 201 sends an acknowledgment signal back to server 101.

The meter installer has an installation route sheet that identifies each service premises that is having a meter installed with a premise identification number. The premise identification number is bar coded. The installer at step 307 scans the bar coded premise identification with his or her handheld unit. The handheld unit is then used to transmit the premises identification to controller 201 via IrDA interface 225 at step 307. Controller 201 stores the premises identification in NVM 205 and transmits the silicon serial number and premise identification number to server 101 at step 309. Server 101 causes the premise identification number to be associated with the silicon serial number in data center 103. At step 310 server 101 detects that the information is provided as a result of a new field installation and utilizes the premise identification number to retrieve schedule and rate information from data center 103 and transmit the schedule and rate information to meter 113 at step 311.

The rate information includes an indication of whether the rate is a flat rate or time of use rate structure. If the rate is a time of use structure, then calendar information is sent. The calendar information may include season information and a list of holidays. In addition, for each season, the rate information may include a weekday schedule, a Saturday schedule, a Sunday schedule and a Holiday schedule. If the rate schedule is a flat rate, then a flat rate configuration is sent to meter 113 that includes no calendars and that the power usage is to be accumulated as a total accumulation. Meter 113 receives the rate information at step 313 and stores it internally in NVM 205 at step 315. The rate schedule is effected immediately upon receipt.

Figure 4:
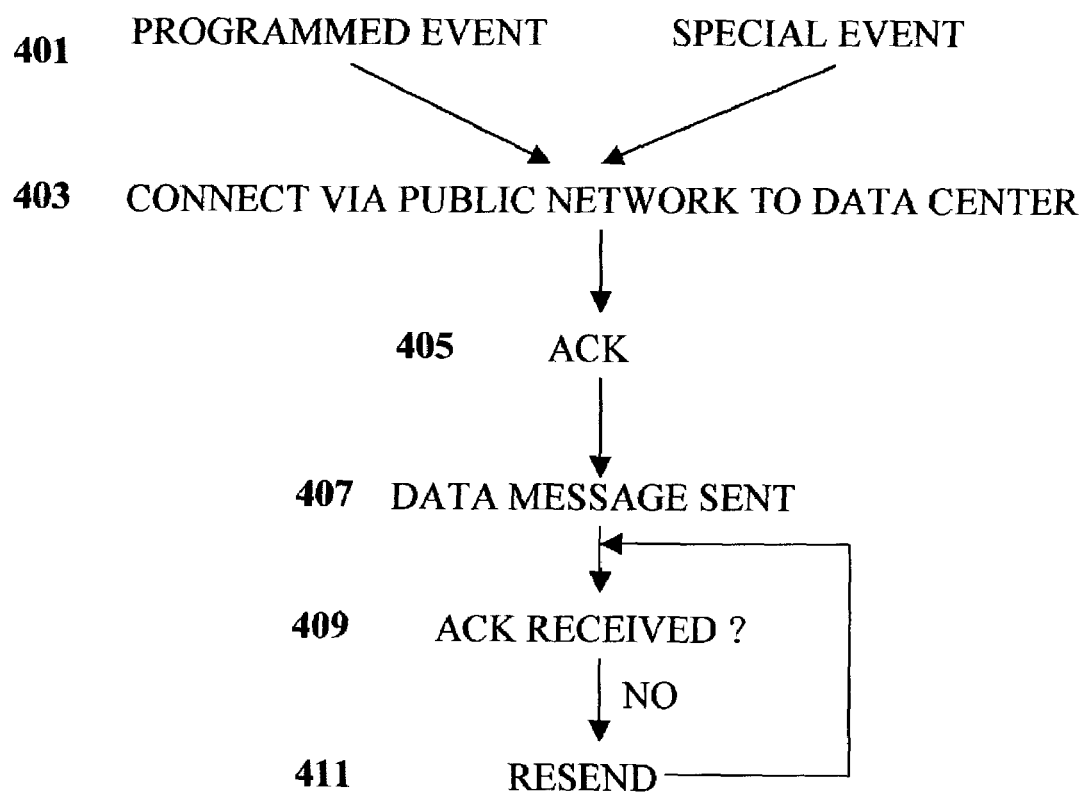

Turning back to FIG. 2, controller 201 communicates to server 101 via modem 223. Modem 223 may operate with any of the cellular telephone system formats that are deployed including GSM or CDMA and including packet or not. In addition, modem 223 is capable of making a direct connection with a remote TCP/IP address as follows as shown in the flow chart of FIG. 4.

At step 401, controller 201 determines that it needs to connect to data center 103 via server 101 The determination is made either as a result of a regular programmed event such as a daily upload, or for a special event such as a loss of power.

Controller 201 utilizes modem 223 to establish a TCP/IP connection at step 403 to server 101. Sever 101 immediately provides an acknowledgment of the connection at step 405. Controller 201 via modem 223 sends a message to server 101 along with appropriate data message at step 407. Server 101 acknowledges receipt of the data message at step 409. Checksum error detection is utilized. In the event that an acknowledgement is not received, controller 201 causes the message to be resent as indicated at step 411. The resend feature may be repeated for a predetermined number of times if an acknowledgment is not received.

As briefly described above in conjunction with FIG. 1, a handheld unit 150 may be used in conjunction with meter 113. Handheld unit 150 may be a commercially available PDA or a personal computer. The hand held unit includes software that permits it to provide the user with certain functionality. As shown in FIG. 2, the illustrative embodiment shows an IrDA interface 225 to permit infrared communication between handheld unit 150 and controller 201. The communications between handheld unit 150 and meter 113 may be classified by function as useful functions, field programming functions and field diagnostic functions.

One particular advantage of the meter of the invention is that the IrDA port and interface permits the use of readily available handheld devices such as Personal Digital Assistants (PDA) or computer with an infrared output or any other programmable device having an infrared communication port. PDA's that may be used are any of those that are commercially available such as the Palm Pilot. In the description that follows, it should be understood that references to PDA include not only commercially available PDAs, but may also include any other portable or handheld computer device.

A properly programmed PDA or computer device 150 may be used to communicate with a meter 113 as shown in FIG. 1. The PDA 150 is carried to a physical proximity of meter 113. PDA 150 utilizes a bar code reader to scan the premise identification bar code and the meter bar code. PDA 150 is used to locally access meter 113 to make fault logs for meters; to force a meter 113 into a communication mode with server 101 and to read the meter. Each PDA 150 includes security in that PDA's are periodically programmed with a password that is verified during access to a meter from server 101. In the event that a password is invalid or expired, communication to server 101 from PDA 150 is blocked.

The useful type of functions includes using handheld unit 150 to set the date and time in meter 113. Handheld unit 150 may also be used to force controller 201 to initiate a connection to server 101 to send all available stored data from meter 113 to server 101, or to force controller 201 to send all previously unset data to server 101. In addition, handheld unit 150 may be used to cause controller 201 to send a power up message to server 101. These field functionalities are listed in Table 1 shown in FIG. 5

Handheld unit 150 may be used to set up configuration of controller 201 by providing the premises identification code to controller 201. In addition, as part of the configuration set up, handheld unit 150 may set Internet Service provider information in controller 201 including a username, password and one or more phone numbers for dial up.

The field programming functions that handheld unit 150 provides may be loaded in a single message for controller 201. These field-programming functions are listed in Table 2 of FIG. 6.

In addition to the above functionality provided, handheld unit 150 can provide field diagnostic functionality to cause controller 201 to display a connect log indicating connections made to server 101. In addition, handheld unit 150 can cause controller 201 to display the states of various information stored in controller 201 memories and NVM 205. The diagnostic information that is obtainable via handheld unit 150 is shown in Table 3 of FIG. 7.

In instances that handheld unit 150 initiates communications between controller 201 and server 101, handheld unit 150 will also transmit a password to controller 201. The password will be sent to server 101 for verification. In the event that the password fails verification, command information sent to server 101 will not be acted on. The password is loaded into handheld unit 150 and is valid for a predetermined time period after which it must be replaced.

Figure 8:
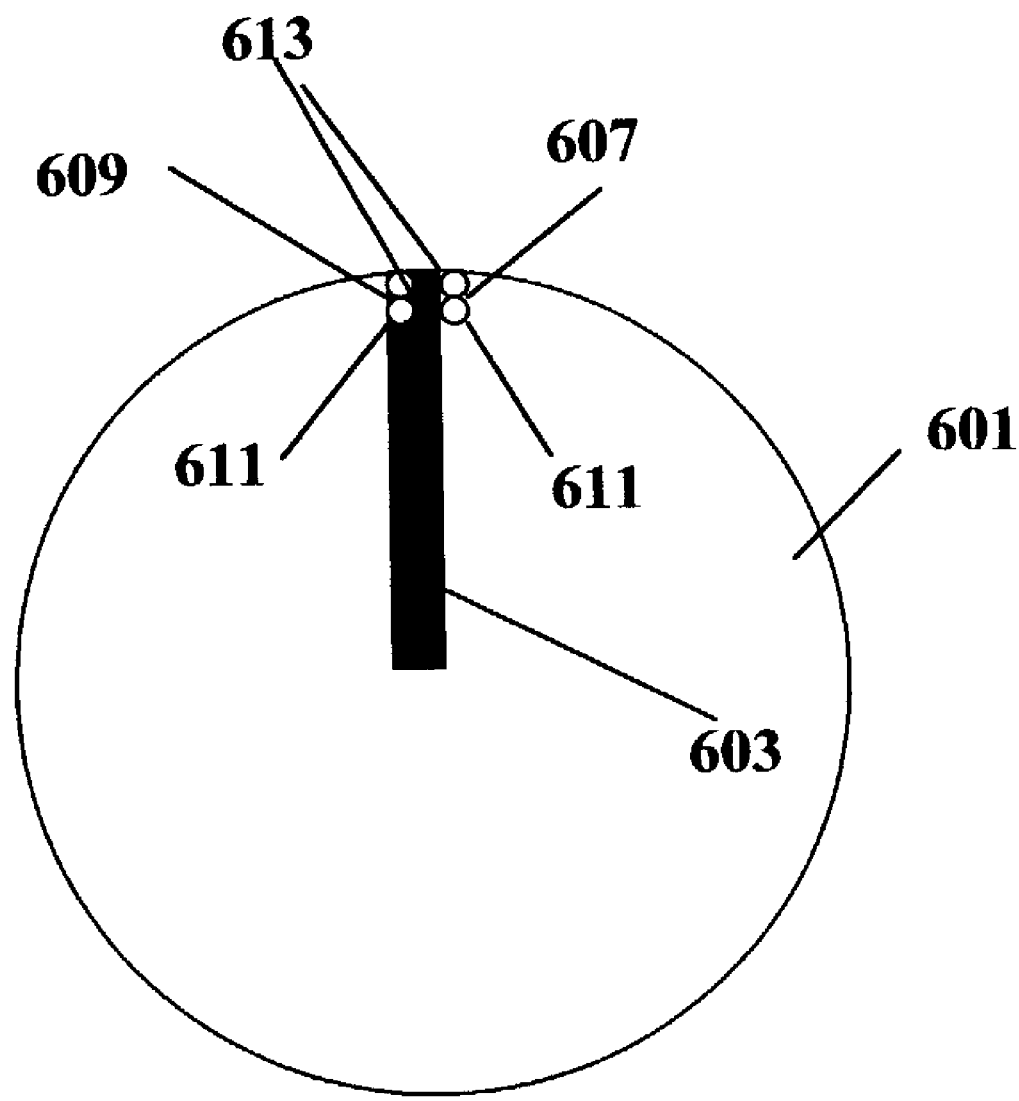
FIG. 8 illustrates a rotating disk in accordance with the principles of the invention.

A significant aspect of the present invention is the manner in which usage data is acquired from the rotating disk of the meter. As shown in FIGS. 8 and 9, rotating disk 601 includes a matte black stripe 603 painted on it. The stripe 603 covers approximately 5 to 10% of the one surface 605 of disk 601. The IrDA interface includes two opto-coupler pairs 607, 609, each comprising an infrared emitter 611 and a phototransistor 613 that are positioned proximate disk 601. The two opto pairs 607, 609 are spaced apart by less than the width of the black stripe 601. The infrared emitters 611 are both pulsed at the same time. Each infrared emitter 611 is pulsed on for approximately 500 microseconds every 5 milliseconds. The output of each phototransistor 613 is coupled to an analog to digital converter that is on controller 201. The outputs of the two opto pairs 607, 609 are sampled while the infrared emitters are pulsed but after a brief settling period. Controller 201 operates in accordance with a program that determines whether each opto pair 607, 609 is proximate the dark stripe 603 on disk 601 or not. When an opto pair 607, 609 is proximate stripe 603, the corresponding phototransistor 613 is "off". When the opto pair 607, 609 is proximate the non-black portions of disk 601, disk 601 reflects the infrared light from emitter 611 back to the corresponding phototransistor 613 of the pair and the phototransistor 613 is "on". The software program operates as a state machine.

If disk 601 is rotating forwards, which is the correct direction for power consumption, then the normal sequence of events for the two opto pairs 607, 609 is as set forth in Table 1.

TABLE 1

| | |
|---|---|
| a. | Opto 1 on, Opto 2, off |
| b. | Opto 1 off (black region), Opto 2 on |
| c. | Opto 1 off, Opto 2 off |
| d. | Opto 1 on, Opto 2 off |
| e. | Opto 1 on, Opto 2 on |

If disk 601 is rotating backwards, then the sequence of events will be as set forth in Table 2.

TABLE 2

| | |
|---|---|
| a. | Opto 1 on, Opto 2, on |
| b. | Opto 1 on, Opto 2 off |
| c. | Opto 1 off, Opto 2 off |
| d. | Opto 1 off, Opto 2 on |
| e. | Opto 1 on, Opto 2 on |

By tracking the sequences of states of the outputs of the opto transistors 607, 609, controller 201 determines whether the direction of rotation is forward or backward. Only these two state sequences will occur if the meter 113 is operating properly. Each time controller 201 identifies the occurrence of one of the two state sequences and each time a predetermined state transition occurs, controller 201 will record one revolution. Assuming that controller 201 detects the first state sequence as shown in Table 1, controller 201 records the revolution as being in a first or forward direction when it detects the state transition from state d. to state e. in Table 1. If controller 201 detects the second state sequence as shown in Table 2, controller 201 records the revolution as being in the second or backward direction when it detects the state transition from state d. to state e. in Table 2.

In operation, controller 201 accumulates the number of revolutions of disk 601 without accounting for whether the rotation is in the forward or reverse direction. In the illustrative embodiment of the invention, each meter 113 is configured as a form 2S type meter. Form 2S is such that the electrical contacts to the power grid and to the served premises are symmetrically configured. Because of the symmetrical configuration, it is possible for the meter to be mounted in the housing upside down. When the meter 113 is placed in the housing upside down, the rotating disk 601 will rotate in the reverse direction. When rotating disk 601 runs backwards, the register is run backwards in conventional meters. More likely than not, a meter 113 that is placed in the housing upside down is the result of an attempt to steal electric power. Accordingly a feature of the present meter 113 is that attempts to steal electrical power by mounting the meter upside down are detected by the detection of a reverse rotating disk and are frustrated because rotations of the disk 601 are accumulated regardless of direction. Controller 201 includes an alerting function that will flag reversed rotation and provide an indication of the reversal to server 101.

Controller 201 is programmed to recognize the above patterns and therefore knows what state should occur next, given a direction of rotation. If the pattern does not occur, a hardware failure has occurred and failure detection is indicated. The fault indication is also provided to server 101.

It should be noted that in some instances, a reversal of direction of rotation is not an indication of attempted theft, but a return of electrical power to the power grid. Controller 201 can be programmed to accumulate both forward and reverse direction power. In the normal instance, a customer would have to have pre-registered with the utility company to provide power back to the utility grid.

The invention has been described in terms of embodiments of the invention. It will be apparent to those skilled in the art that various changes and modifications may be made to the embodiments shown and described without departing from either the spirit or scope of the invention. It is intended that the invention include all such changes and modifications. It is further intended that the invention not be limited to the illustrative embodiments shown and/or described. It is intended that the invention be limited only by the scope of the claims appended hereto.

What is claimed is:

1. A utility meter, comprising:
an electromechanical metering portion connectable to a power drop to a premises; and
an electronic portion coupled to said electromechanical portion;
said electromechanical portion comprising a rotating disk portion, said disk rotating at speeds proportional to power flow through said meter;
said electronic portion comprising: an interface coupled to said rotating disk; a controller coupled to said interface for accumulating power usage data over predefined intervals; a memory coupled to said controller for storing said power usage data; a modem interface for coupling said controller to a public network; said controller programmably operative to automatically establish a connection via said modem interface for uploading of said power usage data stored in said memory.

2. A meter in accordance with claim 1, wherein:
said connection is an Internet connection.

3. A meter in accordance with claim 1, wherein:
said connection is a TCP/IP connection.

4. A meter in accordance with claim 1, wherein:
said electronic portion comprises rate software for determining a rate plan for use with said controller to provide said power usage data.

5. A meter in accordance with claim 4, wherein:
said rate plan is a time of use plan.

6. A meter in accordance with claim 4, wherein:
said rate plan is a flat rate plan.

7. A meter in accordance with claim 4, wherein:
said rate software is loaded into said electronic portion via said modem interface.

8. A meter in accordance with claim 1, wherein:
said electronic portion comprises a unique electronic serial number embedded in said meter, said serial number being readable by said controller.
9. A meter in accordance with claim 1, wherein:
said electronic portion comprises a real-time clock coupled to said controller.
10. A meter in accordance with claim 1, wherein:
said interface coupled to said rotating disk comprises an optical coupler.
11. A meter in accordance with claim 1, wherein:
said electronic portion comprises an infrared data interface coupled to said controller.
12. A meter in accordance with claim 1, wherein:
said modem interface comprises a wide area network interface.
13. A meter in accordance with claim 12, wherein:
said wide area network interface comprises at least one of analog modem functionality, cellular telephone modem functionality, satellite communication functionality, 2 way paging functionality, and power line carrier functionality.
14. A meter in accordance with claim 13, wherein:
said connection is an Internet connection.
15. A meter in accordance with claim 13, wherein:
said connection is a TCP/IP connection.
16. A meter in accordance with claim 1, wherein:
said electronic portion comprises a display module for providing electronically generated human readable outputs of energy consumption.
17. A meter in accordance with claim 16, wherein:
said display module comprises a display disposed within said meter.
18. A meter in accordance with claim 16, wherein:
said display module comprises a display physically remote from said meter.
19. A meter in accordance with claim 1, comprising:
a unique identification number displayed on said meter.
20. A meter in accordance with claim 1, wherein:
said electronic portion comprises a non-volatile memory storing an initialization and self-test program;
said controller executing said initialization and self-test program under predetermined conditions.
21. A meter in accordance with claim 20, wherein:
said controller automatically establishing a TCP/IP connection via said modem interface to send a predetermined message after executing said initialization and self-test program.
22. A meter in accordance with claim 1, wherein:
said controller is responsive to command information received via said modem interface to upload data from said meter.
23. A meter in accordance with claim 1, wherein:
said controller downloads meter configuration information via said modem interface;
said controller being operable to utilize said configuration information to control at least power usage information obtained by said meter for uploading via said modem interface.
24. A meter in accordance with claim 1, wherein:
said electronic portion comprises a communications interface.
25. A meter in accordance with claim 24, wherein:
said communications interface comprises an optical link.
26. A meter in accordance with claim 25, wherein:
said controller is responsive to information received via said communication interface to receive premise identification information.
27. A meter in accordance with claim 26, wherein:
said controller automatically transmits said premise identification information from said meter via said modem interface.
28. A meter in accordance with claim 25, wherein:
said controller downloads configuration information via said optical link.
29. A meter in accordance with claim 1, wherein:
said electronic portion comprises memory storing at least one telephone number for an Internet service provider.
30. A method in accordance with claim 29, wherein:
said controller automatically utilizes said at least one telephone number to access a server via said modem interface.

* * * * *